Nov. 20, 1934.  R. O. MOBBS  1,981,843
MOVABLE ROOF FOR VEHICLES
Filed July 14, 1932  2 Sheets-Sheet 2
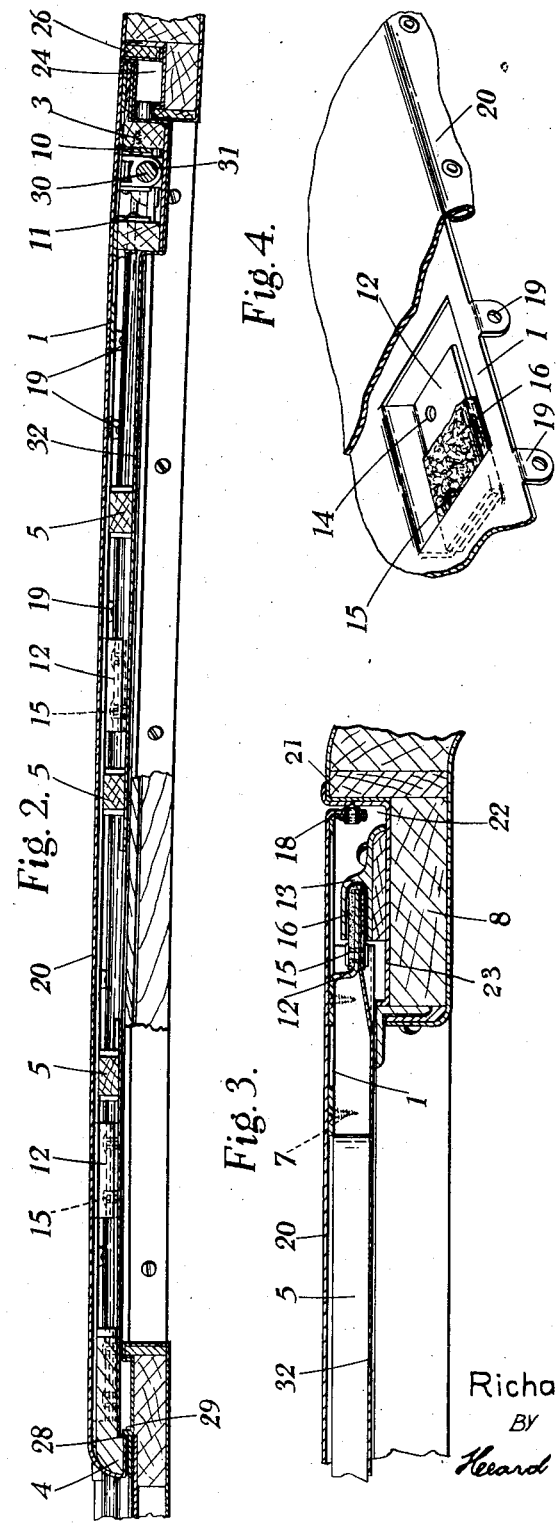
INVENTOR
Richard O. Mobbs
BY
Heard Smith & Tennant.
ATTORNEYS Patented Nov. 20, 1934

1,981,843

UNITED STATES PATENT OFFICE 1,981,843

MOVABLE ROOF FOR VEHICLES

Richard Oliver Mobbs, London, England, assignor to The Pytchley Autocar Company, Limited, Slough, England, organized under the laws of Great Britain Application July 14, 1932, Serial No. 622,386
In Great Britain July 17, 1931

7 Claims. (Cl. 296—137)

This invention has reference to improvements in or relating to movable roofs of vehicles.

A large number of motor cars are provided with roofs that have a large opening in the front portion and a sliding panel that may be moved longitudinally of the car either to a position in which it completely closes, covers or obstructs said opening or to some other desired position in which it leaves the opening partly or wholly free and unobstructed.

As heretofore usually constructed the sliding panel comprises a rectangular frame of wood made up of two parallel side-bars and two parallel main cross-bars at the respective ends of the side-bars and several other parallel cross-bars intermediate of the main cross-bars, all the cross-bars being rigidly secured to the side-bars so that distortion of the frame from its rectangularness is practically impossible.

This rigidity of the frame (and consequently of the finished panel also) ensures that there is no possibility of jamming of the panel when in use, and also that the panel will slide easily in its supports whether the force to move it be brought to bear centrally or on one side, and also there is absence of rattle and any usual means to secure the panel in adjusted position may easily be applied.

The finished panel has a number of shoes or runners which are attached to the side-bars of the frame (the said runners being covered with leather, felt or the like) and engaged in rails provided on the fixed part of the roof and along which rails the panel may slide. Also secured to each side-bar is a thin metal weather-shield that extends at the side of the panel over and beyond the rails to keep out or assist in keeping out rain-water, and a fabric covering material is applied and suitably fixed to the top and bottom faces of the frame.

Panels constructed as briefly above described possess one or more of various advantages over other known movable roof parts, in that they are of greater simplicity, lighter in weight, more simple to fit, less liable to get out of order, and cheaper to make (which advantages in part at least account for the fact that these panels are fitted to by far the largest proportion of cars with the opening roofs in use).

Some makers of cars (or car bodies) have for some time past been and continue to put on the market bodies the roofs of which have a comparatively flat curvature from the front to more or less about three quarters the length of the roof and then a very much more pronounced curvature; in other cases a fairly pronounced curvature is given to the roof almost throughout its entire length. It is not possible to provide roofs having these pronounced curvatures with sliding panels constructed as above briefly described, unless the opening in the front part of the roof is appreciably shorter than is usually desirable and which may be obtained in the case of car roofs having a fairly flat curvature throughout substantially their whole length.

This difficulty has more recently been voiced, by makers of cars the bodies of which have the curved roofs in question, in view of the fact that the rigid type of panel (as distinct from the roller-blind or the collapsible type of movable roof) is preferred by them to any other.

The main object of my invention is to enable cars the roofs of which have curvatures of comparatively small radius to be provided with a sliding panel adapted to cover and uncover an opening in the roof as large as (or even larger than) usually provided in cars having fairly flat shaped roofs. A further object of the invention is to provide a sliding panel suitable for any (or at any rate any of the usual) curvatures of car roofs and which preferably will also be readily adaptable to various lengths of openings.

In panels of known form as above described the wood cross-bars and side-bars of which the frames are made require to be accurately cut and fitted together and the shoes and runners too require to be made accurately and fitted in correct positions along the side-bars, to ensure that the finished panel will work smoothly and without either jamming or rattling when in use. The weather-shields also require to be carefully fitted to ensure the desirable neatness in the appearance of the finished panel. The major part of the cost of the finished panels is therefore in respect of skilled labour notwithstanding that appropriate machinery may be utilized to aid in carrying out some of the work. Although the manufacture of these sliding panels has largely become a specialized business (because many car body builders find it more convenient to obtain either the finished panels, or the parts thereof ready for assembling, from those specializing in their manufacture) there are so many different sizes and shapes of car bodies in use and being produced, that it is not possible to bring to bear mass-production methods or systems to the extent desirable in the production of the panels and the parts thereof.

Further objects of my invention are to obviate the difficulties above set out and to provide a panel which, whilst having the desired rigidity, is of more simple construction, may be made lighter in weight, lends itself to easy assembly, and possesses other important advantages.

According to the present invention the side members of the panel comprise thin metal plates having the necessary flexibility to enable them readily to bend and thus adapt themselves to the various curvatures of car roofs.

By this simple improvement very important advantages are obtained in that without impairing the desirable rigidity (as above described) of the panel this latter nevertheless becomes flexible in the direction perpendicular to the plane of its surface longitudinally thereof or to a roof having a pronounced curvature.

By reason of the adaptability of the panel to practically all shapes of roofs the cost of production can be reduced by mass-production on a large scale.

In accordance with my invention the panel comprises flexible metal side portions and relatively rigid portions connecting same. When the panel is made in one piece, say by stamping it from a sheet of suitable metal, the relatively stiff or rigid portions intermediate of and connecting the flexible side portions could conveniently be produced by making transverse slits or slots in the sheet of metal at suitable distances apart and extending the full distance between the side portions and bending down a narrow strip of the metal at the edges of the slits or slots whereby the desired stiffness is imparted to said intermediate or connecting portions, although I do not limit the scope of my invention to this method of producing stiffness in said connecting portions.

In practice it will probably be found preferable to make the flexible metal side portions separate from the rigid portion connecting them. For instance the rigid portions may be made of wood, the said portions being secured to the flexible metal side portions by screws or otherwise. By making the panel of separate parts as described, it will easily be possible to construct panels of various widths, it being for this purpose necessary merely to cut the rigid wood connecting parts of greater or lesser length.

The employment of the plates enables me still further to reduce the amount of fitting required to be done by forming the shoes or runners integral with the shields, instead of making and thereafter securing in correct positions specially made runners, this being attained by so piercing the shields at appropriate places as to form tongues which may be bent into the form of runners (and which are to be covered with leather, felt or other suitable material). The plates may also be formed with apertures to increase their flexibility and to lessen their weight.

The metal plates may be arranged to form weather-shields either by themselves or in combination with a flexible panel cover.

In order that the invention may be easily understood and readily carried into effect I now propose to describe a preferred constructional form thereof with reference to the accompanying drawings, but desire it to be understood that the scope of my invention is not limited to the said constructional form.

In said drawings:—

Fig. 2 is a section on an enlarged scale on line II—II of Fig. 1;

Fig. 3 is a section on an even larger scale on line III—III of Fig. 1; and

Fig. 4 is a perspective of a part of one of the plates.

Figure 1:
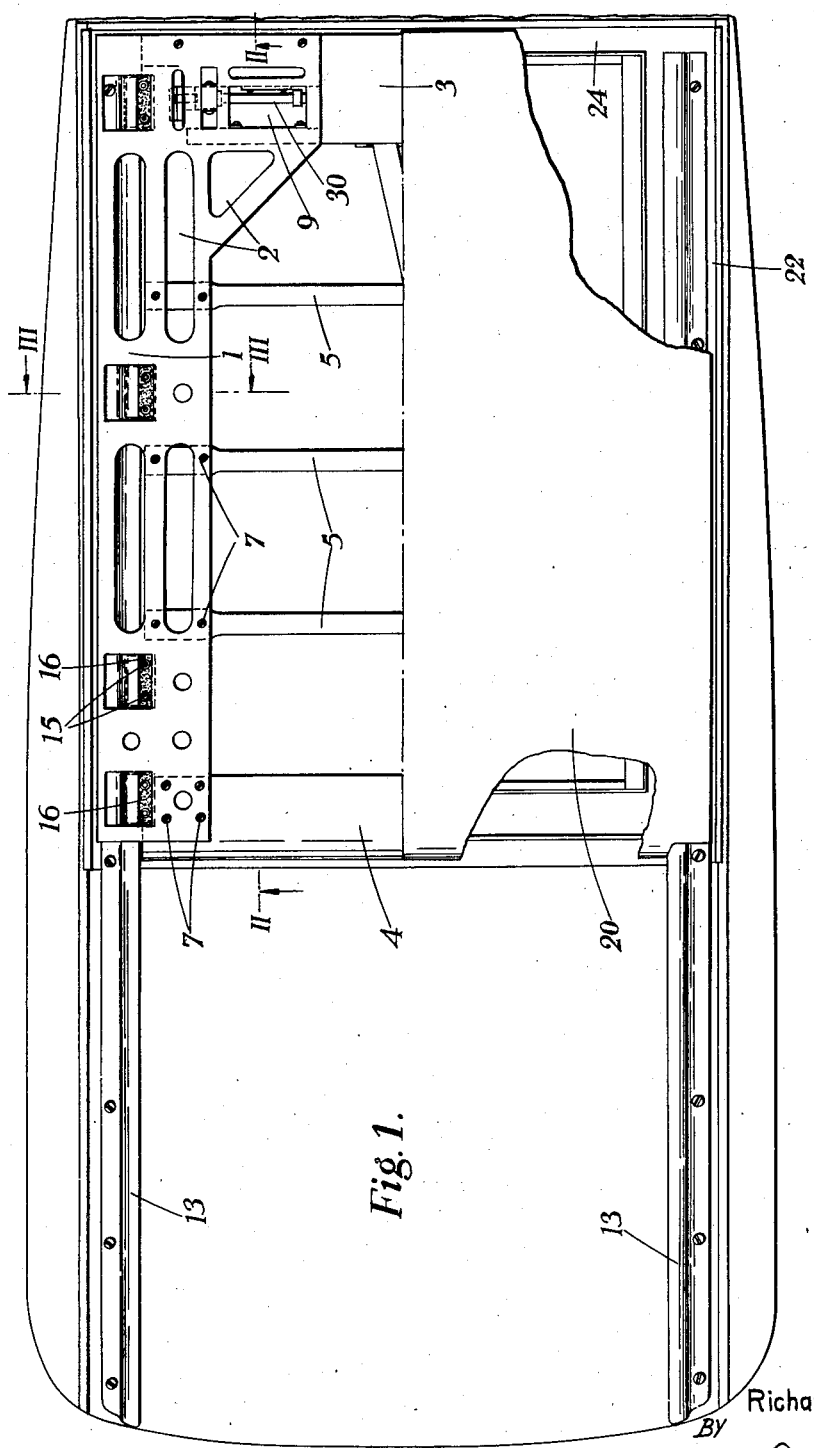
Fig. 1 is a plan of a roof of a motor-car having a sliding panel parts of which are broken away to show certain details of construction.

The plates 1 are wider at their front ends than at the remainder of their length as can be seen from Figure 1 and are provided with apertures 2 which increase the flexibility and lessen the weight of the plates. The front cross-bar 3 and rear cross-bar 4 are made wider than the intermediate cross-bars 5. All the cross-bars are secured to the metal plates 1 by screws 7 that pass through apertures provided in the plates. One of the plates is provided with a rectangular opening 9 the metal from which is left attached to the plate in the form of two lugs 10, 11, that are turned down into a corresponding opening cut in the cross-bar 3 and secured to the cross-bar by screws and bolts. Thus a very rigid structure is produced which however is flexible vertically longitudinally of the vehicle. The two opposed side walls of the opening in the car roof are stepped as shown in Fig. 3 and on the step 8 of each side wall is secured a slide or guideway 13 in which the panel is guided. Each slide or guideway 13 is located below the top surface of the portion of the car roof surrounding the opening. Each sheet metal plate 1 is pierced at intervals along its length to form tongues 12 that are bent to form runners adapted to slide in said rails or guideways 13 attached to the fixed part 8 of the vehicle roof. These runners 12 are provided with apertures 14 to receive rivets 15 whereby packing 16 of leather, felt or other suitable material is attached to the runners.

The outer edges of the plates 1 are formed at intervals with lugs as at 18, 19, to which the marginal portion of the usual flexible covering material 20 is secured. The said edges extend at each side to near the vertical face 21 of the fixed part of the roof, and they constitute weather shields over the slide 13 and the runners therein, any rain entering between the weather shield and the shoulder being received in the channel 22 (which may be provided with a metal lining 23) along which it will run to the front transverse channel 24 or to the transverse channel 29 at the rear edge of the opening. From these transverse channels the rain water is allowed to escape through suitable apertures (not shown). The front of the plates 1 and of the cross-bar 3 extend over the channel 24 and form a water-tight engagement with a member 26. Similarly a shoulder 28 of the cross-bar 4 engages a rib 29 on a metal fitting attached to the fixed part of the roof.

A bolt or other device 30 for securing the panel in its adjusted position is located within the opening referred to in the cross-bar 3, and this bolt is supported by lugs 31 pressed out of one of the plates 1. The numeral 32 indicates a cover secured to the lower or inner side of the sliding panel.

The plates 1 of course require to be made of a length suited to the particular roof opening to which the improved panel is to be fitted and in order that mass-production may be called in aid as far as possible, I propose to make the said plates of a length suitable for the longest car roof opening for which the improved panels are likely to be required and for fitting to shorter roof openings it will be necessary merely to cut the plates down to the appropriate length.

In the case of some cars—for instance motor-coaches—the whole of the main portion of the roof may be constructed as a sliding panel as described in which case the panel as it is moved rearwards may be received in the space between a double back or end of the car and also in a space provided between a double bottom of the car.

Panels made according to this invention may readily be assembled and therefore the parts thereof comprising the wood cross-bars, the plates with the necessary bolts, screws, and other fittings, can be packed into a comparatively small compass for transit.

In some cases car body builders can easily, and in some instances would prefer to, make the wood cross-bars themselves, in which cases it will be necessary only to send the plates ready punched and provided with the runners and other formations, together with any fittings that may be required for the complete assembly of the panels. The outer fabric covers would in almost any event be provided by the car builders.

What I claim is:—

1. For vehicle roofs having an opening, a panel for covering said opening, said panel comprising a frame constituted by flexible sheet metal side members and rigid cross-bars connecting said flexible side members, and a plurality of runner elements struck out of each of said side members.

2. A vehicle roof having an opening, the side walls of which are stepped, guides on the steps of opposed side walls, a panel comprising a frame constituted by flexible sheet metal side members and rigid cross-bars connecting said side members, each side member having a runner portion to engage in the corresponding guide, said runners being sufficiently below the side members so that the top of the panels comes flush with the top portion of the roof surrounding said opening, the side edges of the panel extending over the guides and being situated within the walls of the opening.

3. A vehicle roof having an opening, the side walls of which are stepped, a guide secured to the step of each side wall, the guides being situated below the top surface of the portion of the roof surrounding the opening, a panel for closing said opening comprising a frame flexible in the direction of the length of the opening, a flexible cover carried by the frame, said frame having runner portions to engage in said guides, which runner portions are situated sufficiently below the panel to bring the top surface thereof flush with the top surface of the roof, the edges of the panel extending beyond the runner portions and being situated within the side walls of the opening.

4. A vehicle roof having an opening, the side walls of which are stepped, a guide carried by the step of each side wall and situated below the top surface of the roof, a panel for closing said opening, said panel having on each side a runner portion to engage the corresponding guide, each runner portion being flexible in the direction of its length, said edges of the panel extending beyond the runner portions and overlying the guides and situated within the walls of the opening, said runners being situated sufficiently below the panel to bring it flush with the top surface of the roof.

5. A vehicle roof having an opening, a panel for closing said opening and comprising a frame constituted by rigid cross-bars and flexible sheet metal side members to which the ends of the cross-bars are secured, a guide carried by the fixed part of the roof at each side of said opening and below the level of the top surface of the roof, runners on said side members for engagement with said guides, said runners being so spaced relative to the side members as to support the panel on a level with the top surface of the sides of the roof, the flexible side members extending beyond the runners and the guides.

6. A vehicle roof having an opening, the side walls of which are stepped, guides on the steps of opposed side walls, a panel comprising a frame constituted by flexible sheet metal side members and rigid cross bars connecting said side members, each side member having a plurality of runner portions to engage in the corresponding guide, said runner portions being struck out of the side members and extending below the same.

7. A vehicle roof having an opening, the side walls of which are stepped, guides on the steps of opposed side walls, a panel for closing said opening, said panel comprising a frame constituted by flexible sheet metal side members and rigid cross bars connecting said side members, each side member having a plurality of runner portions struck out of the side members and extending therebelow and adapted to operate in said guides, said flexible sheet metal side members having continuous outer edges, and a flexible cover carried by the frame and secured to said continuous edges.

RICHARD OLIVER MOBBS.